(12) United States Patent
Calderwood

(10) Patent No.: US 7,456,868 B2
(45) Date of Patent: Nov. 25, 2008

(54) DIGITAL CAMERA WITH ISO PICKUP SENSITIVITY ADJUSTMENT

(76) Inventor: Richard C. Calderwood, 2775 NW. 126th Ave., Portland, OR (US) 97229

( * ) Notice: Subject to any disclaimer, the term of this patent is extended or adjusted under 35 U.S.C. 154(b) by 862 days.

(21) Appl. No.: 10/061,907

(22) Filed: Feb. 1, 2002

(65) Prior Publication Data

US 2003/0146986 A1 Aug. 7, 2003

(51) Int. Cl.
*H04N 5/235* (2006.01)
*H04N 5/238* (2006.01)

(52) U.S. Cl. ............... 348/229.1; 348/230.1; 348/364; 348/366

(58) Field of Classification Search .............. 348/222.1, 348/221.1, 229.1, 230.1, 362–367, 370–371
See application file for complete search history.

(56) References Cited

U.S. PATENT DOCUMENTS

| | | | | |
|---|---|---|---|---|
| 5,712,682 A * | 1/1998 | Hannah | ........................ | 348/255 |
| 5,781,807 A * | 7/1998 | Glassgold et al. | ............. | 396/71 |
| 6,603,508 B1 * | 8/2003 | Hata | ........................ | 348/229.1 |
| 6,737,909 B2 * | 5/2004 | Jaussi et al. | .................. | 327/541 |
| 6,765,610 B1 * | 7/2004 | Nakamura | ................ | 348/222.1 |
| 6,784,938 B1 * | 8/2004 | Kidono et al. | .............. | 348/364 |
| 6,831,687 B1 * | 12/2004 | Suzuki | ........................ | 348/251 |
| 2001/0004271 A1 * | 6/2001 | Konishi | ........................ | 348/371 |
| 2003/0133021 A1 * | 7/2003 | Hamamura et al. | ....... | 348/229.1 |
| 2004/0109082 A1 * | 6/2004 | Yokonuma | .................... | 348/371 |

OTHER PUBLICATIONS

"Nikon Coolpix 990 review: p. 5. Operation [Digital Photography Review]," C. 1998-2000, pp. 1-4, http://www.dpreview.com/reviews/nikoncp990/page5.asp, DPReview.Com.
"Nikon Coolpix 990 review: p. 10. Features [Digital Photography Review]," C. 1998-2000, pp. 1-6, http://www.dpreview.com/reviews/nikoncp990/page10.asp, DPReview.Com.

* cited by examiner

*Primary Examiner*—Lin Ye
*Assistant Examiner*—Kelly Jerabek
(74) *Attorney, Agent, or Firm*—Blakely, Sokoloff, Taylor & Zafman LLP

(57) ABSTRACT

A digital imaging system such as a camera, in which the ISO sensitivity of a digital imaging sensor is dynamically adjusted in response to factors such as zoom, focal distance, available light, color of the image, charge status of the flash device, and so forth.

40 Claims, 1 Drawing Sheet

DIGITAL CAMERA WITH ISO PICKUP SENSITIVITY ADJUSTMENT

BACKGROUND OF THE INVENTION

1. Technical Field of the Invention

The present invention relates generally to digital cameras, and more particularly to a digital camera that has the ability to adjust the ISO sensitivity of its optical pickup.

2. Background Art

Film cameras can be loaded with various "speeds" of film, typically expressed in terms of the ISO of the film. Typically, slower film (with a lower ISO number) will offer better image capture and resolution, while faster film (with a higher ISO number) allows photography at higher shutter speeds (such as for action shots) or in lower light conditions, albeit at some sacrifice in image resolution or quality.

Digital cameras use charge-coupled devices (CCDs), CMOS pickups, or other suitable semiconductor devices to capture an optical image from a lens system and convert it into an electronic representation of that image. Many digital cameras offer the user the ability to manually set the "ISO" of the pickup device. At lower ISO settings, the pickup will generally produce a better quality image, but only with sufficient light (either in brightness or in shutter duration). At higher ISO settings, the pickup will work with faster shutter settings or lower ambient light conditions, but will typically produce a noisier and/or grainier image. If a low ISO setting is used in very low light conditions (caused by low ambient light, a not-yet-recharged flash, a fast shutter speed, a small iris aperture, etc.), a digital imaging pickup may capture an image file consisting primarily of pixel values clustered very near the zero point (e.g. black). On the other hand, if a high ISO setting is used in very high light conditions, the pickup may capture an image file consisting primarily of pixel values clustered very near the saturation point or maximum value (e.g. white). By manually setting the ISO setting appropriately, the user can, in effect, shift the clustering of the pixel values upward or downward in the range between zero and the maximum value (between black and white), to achieve a better image.

A few digital cameras, such as the Nikon Coolpix 990, have an "auto ISO" mode in which the camera sets the ISO based-solely, I believe-on the amount of available light.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

Figure 1:
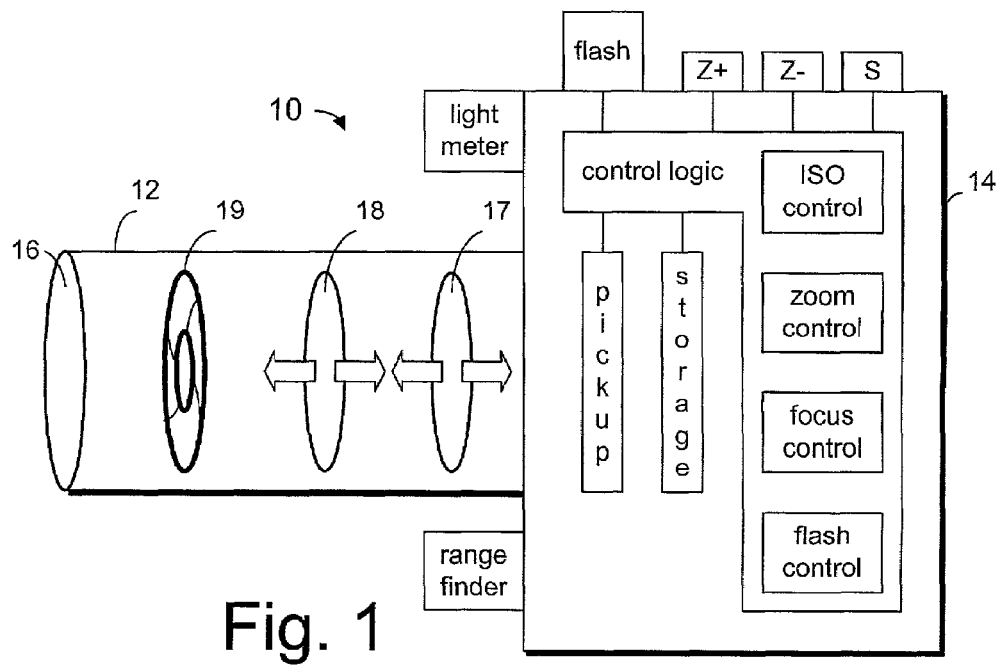
FIG. 1 shows a stylized block diagram of the various components of one embodiment of a camera utilizing this invention.

FIG. 1 illustrates one exemplary embodiment of a camera 10 according to the teachings of this invention. The camera includes a lens assembly 12 and a body assembly 14. The lens is illustrated in a simplified form, showing only a primary lens element 16, a moveable focus lens element 17, a moveable zoom lens element 18, and an adjustable iris aperture element 19. The skilled reader will appreciate that lens systems are generally much more complex and perhaps quite different than this example, and that these elements are shown in this simplified form for ease of explanation of the principles of the invention.

The body assembly 14 includes a range finder, which is typically an infrared beacon and receiver. It typically also includes a flash mechanism, which in some cases may be the actual flash device, but in others it may be a "hot shoe" that provides a mounting point for an external flash, and output connectors for providing control signals to the external flash, while in others it may be simply an output (e.g. a wireless output) for the control signals, with the flash as a separate, remote unit.

It also includes buttons for zooming in and out ("Z–" and "Z+") as well as a shutter activation button ("S"). It may include controls (not shown) for setting the iris aperture, and controls for setting the shutter speed. A digital imaging pickup, such as a CCD or CMOS element, is mounted so as to be in the optical path of the lens assembly. The lens may also include a shutter element (not shown), or the shutter may be implemented electronically via control of the pickup.

One or more forms of digital storage may be included for storing images, and may include CompactFlash, Memory-Stick, SmartMedia, MicroDrive, or other suitable storage means. The camera may, in some embodiments, include a light meter, while in other embodiments it may use the digital imaging pickup itself for light metering. The camera may include a range finder, such as an infrared transmitter and receiver, or a split-lens or binocular range finder.

Finally, the camera includes control logic for controlling the various operations of the camera. The control logic may be hardwired logic, or it may be software or firmware for execution by a processor (not shown), or other conventional means. The control logic may include flash control logic for controlling if and when and for how long and at what intensity the flash is operated. The control logic may further include focus control logic for moving the focus lens element, typically in response to data from the range finder and in-some cases also data from the zoom lens element, and perhaps even data from the pickup. The control logic may further include zoom control logic for controlling the position of the zoom lens element, in response to user inputs at the zoom in and zoom out buttons. The control logic further includes ISO control logic for setting the ISO setting of the pickup. The control logic will typically also include additional logic (not shown as separate sub-elements of "control logic"), such as logic for controlling or responding to the iris element of the lens, logic for controlling or responding to the shutter element of the lens or its pickup-implemented equivalent, logic for storing date and time, logic for performing image compression, logic for formatting the storage, logic for outputting images from the storage to another device such as a television or a computer, and so forth.

Figure 2:
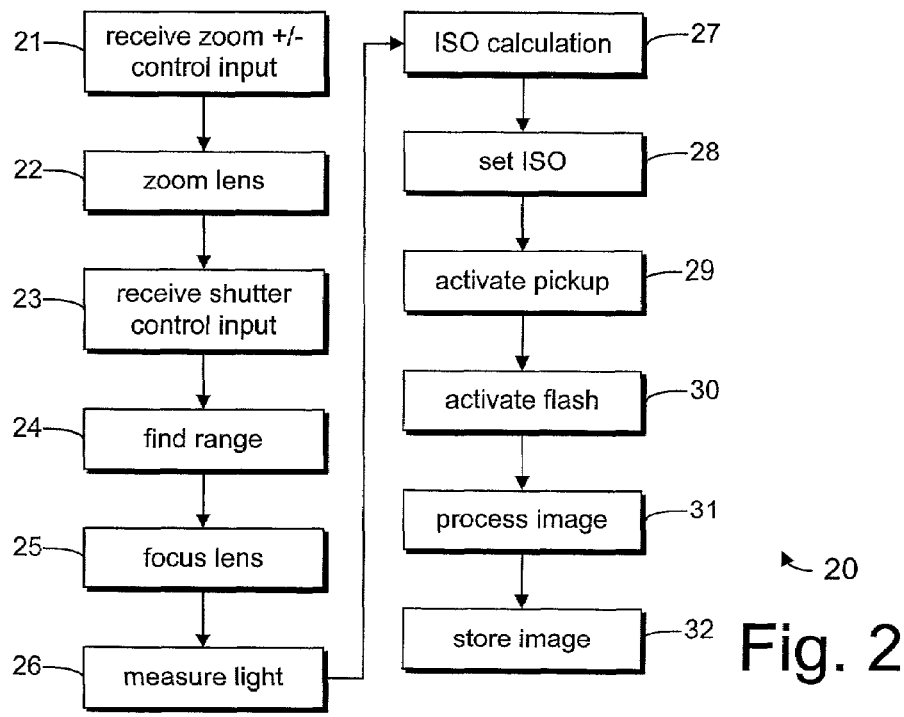
FIG. 2 shows one embodiment of a method of operation of the camera utilizing this invention.

FIG. 2 illustrates one embodiment (20) of a method of operation of the camera. The control logic receives (21) zoom in and/or zoom out inputs from the user, and the zoom control logic zooms (22) the lens accordingly. The control logic receives (23) a shutter control input from the user, such as a half-way pressing of the shutter button, and the focus control logic activates (24) the range finder to determine the distance to the object being photographed. In response to the range and perhaps other criteria, the focus control logic focuses (25) the lens. The flash control logic uses the light meter to measure (26) the ambient light. In response to one or more data from one or more of the other pieces of control logic, the ISO control logic calculates (27) an ISO setting, and sets (28) the pickup to that ISO sensitivity. Upon a full pressing of the shutter button, the control logic activates (29) the pickup to start capturing the image, and activates (30) the flash if needed. The control logic processes (31) the captured image, such as by white-balancing, adjusting contrast, adjusting brightness, compressing, and so forth, and stores (32) the processed image in the storage.

The invention lies in the operation of the ISO control logic. Using known digital cameras, the ISO setting is not automatically or dynamically adjusted, but is manually set by the user.

The ISO control logic may adjust the ISO setting upward or downward, depending upon one or more factors indicated by data from other parts of the camera. For example, the ISO control logic may determine that, because the camera is focused at a great distance, the flash will be of no use (as flash intensity falls of as the distance squared), and cause the flash control logic to leave the flash off, while turning the ISO sensitivity up.

Alternatively, the ISO control logic may determine that an object in the frame is too close, regardless of focus setting, and would be washed out by the flash, and may cause the flash control logic to reduce the flash intensity or duration, and/or it may lower the ISO setting accordingly.

Alternatively, the ISO control logic may determine that the combination of long focal length (zoomed way out) and high shutter speed likely means that the user is taking high-speed action photographs at an outdoor event such as a motorcycle race, and may adjust the ISO setting accordingly.

Alternatively, the ISO control logic may determine that the flash has not yet recharged from taking a previous photograph, and may temporarily turn the ISO setting up to allow immediate capture of an image, albeit at a perhaps lower quality than the prior one that had flash support Alternatively, the ISO control logic may determine that the iris (not shown) of the lens system and the shutter speed of the pickup cannot together compensate for the intense light that the light meter is detecting, and may turn the ISO setting down in order to capture an image that is not overly saturated.

Alternatively, the ISO control logic may determine that the pickup is finding large areas of virtually identical color value, which may indicate that the light conditions are sub-optimal for the particular photographic subject, and may adjust the ISO setting accordingly. In some embodiments, it might even jump back and forth, bracketing the ISO setting, until it finds one in which the colors have more contrast, with reduction of the blocks of the seemingly same color. For example, it is well known that various colors do not photograph well with digital cameras, such as some blues, and that some color combinations are problematic, such as white-on-white dress shirts, or black corduroy trousers.

Some pickups may facilitate ISO adjustment that is not "all or nothing". For example, a pickup may allow ISO adjustment of its red pixels separately from its green pixels separately from its blue pixels. Or, it may allow separate ISO adjustment of distinct regions or groups of pixels. The invention may be applied to the entire pickup, or to one or more color groups of pixels, or to one or more geographic regions of pixels, separately.

The ISO control logic may, in some embodiments, be responsive to at least one camera setting and at least one environmental characteristic. Camera settings include such things as focal distance or range, zoom distance or effective lens length, shutter speed, iris aperture, flash intensity or availability or color or the like, and so forth. Environmental characteristics include such things as ambient light, motion of the subject, color content of the imaged scene, and so forth.

The reader will appreciate that these are but examples, and that a camera could use a variety of data inputs in performing a dynamic ISO setting calculation.

The reader will also appreciate that this invention is not limited to use with still cameras, but can be used in a variety of digital imaging systems, such as video cameras, closed circuit television cameras with or without storage, microscopes, telescopes, binoculars, spotting scopes, rifle scopes, optical range finders, automobile imaging systems, and so forth. Furthermore, the reader will appreciate that it can be used outside the human-visible spectrum, such as in forward-looking infrared radar systems, automobile heads-up display thermal imaging systems, and so forth.

The reader will appreciate that the invention can be used with a variety of lens systems, and that any particular such lens system may have a zoom system and/or a focus system. The reader will further appreciate that the camera need not necessarily include the actual light-emitting component of the flash system.

The reader will appreciate that drawings showing methods, and the written descriptions thereof, should also be understood to illustrate machine-accessible media having recorded, encoded, or otherwise embodied therein instructions, functions, routines, control codes, firmware, software, or the like, which, when accessed, read, executed, loaded into, or otherwise utilized by a machine, will cause the machine to perform the illustrated methods. Such media may include, by way of illustration only and not limitation: magnetic, optical, magneto-optical, or other storage mechanisms, fixed or removable discs, drives, tapes, semiconductor memories, organic memories, CD-ROM, CD-R, CD-RW, DVD-ROM, DVD-R, DVD-RW, Zip, floppy, cassette, reel-to-reel, or the like. They may alternatively include down-the-wire, broadcast, or other delivery mechanisms such as Internet, local area network, wide area network, wireless, cellular, cable, laser, satellite, microwave, or other suitable carrier means, over which the instructions etc. may be delivered in the form of packets, serial data, parallel data, or other suitable format. The machine may include, by way of illustration only and not limitation: microprocessor, embedded controller, PLA, PAL, FPGA, ASIC, computer, smart card, networking equipment, or any other machine, apparatus, system, or the like which is adapted to perform functionality defined by such instructions or the like. Such drawings, written descriptions, and corresponding claims may variously be understood as representing the instructions etc. taken alone, the instructions etc. as organized in their particular packet/serial/parallel/etc. form, and/or the instructions etc. together with their storage or carrier media. The reader will further appreciate that such instructions etc. may be recorded or carried in compressed, encrypted, or otherwise encoded format without departing from the scope of this patent, even if the instructions etc. must be decrypted, decompressed, compiled, interpreted, or otherwise manipulated prior to their execution or other utilization by the machine.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances "an embodiment," "one embodiment," or "some embodiments" are not necessarily all referring to the same embodiments.

If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Those skilled in the art having the benefit of this disclosure will appreciate that many other variations from the foregoing description and drawings may be made within the scope of the present invention. Indeed, the invention is not limited to the details described above. Rather, it is the following claims including any amendments thereto that define the scope of the invention.

What is claimed is:

1. An apparatus comprising:
   a charge-coupled device (CCD);
   first control logic including both of:
      zoom control logic for interacting with a zoom capability of a lens system; and
      focus control logic for interacting with a focus capability of the lens system; and
   second control logic including ISO control logic for dynamically setting, without manual intervention by a user of the apparatus, a sensitivity of the CCD in response to data from the first control logic, data from other settings of the apparatus, and data from environmental characteristics surrounding the apparatus;
   wherein the other settings of the apparatus include shutter speed, iris aperture, flash intensity, availability, and color; and
   wherein the environmental characteristics include ambient light, motion of a subject of the lens system, and color content of an imaged scene of the lens system.

2. The apparatus of claim 1 further comprising:
   an output for sending control signals to a flash device;
   the first control logic further including flash control logic for controlling the flash device; and
   the ISO control logic is further responsive to data from the flash control logic to dynamically set the sensitivity of the CCD.

3. The apparatus of claim 1 further comprising:
   a range finder;
   the ISO control logic is further responsive to data from the range finder to dynamically set the sensitivity of the CCD.

4. The apparatus of claim 1 further comprising the lens system coupled to the apparatus.

5. The apparatus of claim 1 configured as a still camera.

6. The apparatus of claim 1 configured as a video camera.

7. The apparatus of claim 1 configured as a microscope.

8. The apparatus of claim 1 configured as a telescope.

9. The apparatus of claim 1 configured as an infrared imaging system.

10. The apparatus of claim 1 configured as binoculars.

11. The apparatus of claim 1 wherein the ISO control logic is adapted to adjust ISO sensitivity of less than the entire CCD. the ISO control logic is further responsive to data from the flash control logic to dynamically set the sensitivity of the CCD.

12. The apparatus of claim 11 wherein the ISO control logic is adapted to separately adjust the ISO setting for an individual color's set of pixels in the CCD.

13. The apparatus of claim 11 wherein the ISO control logic is adapted to separately adjust the ISO setting for a geographic region of pixels in the CCD.

14. A digital camera comprising:
   a lens system including a zoom capability;
   a charge-coupled device (CCD) in an optical pathway of the lens system;
   a zoom in button;
   a zoom out button;
   a shutter button; and
   control logic including:
      zoom control logic responsive to the zoom in button and the zoom out button to operate the zoom capability of the lens system;
      focus control logic coupled to the lens system to control the focus capability; and
      ISO control logic to automatically adjust, without manual intervention by a user of the digital camera, a sensitivity of the CCD responsive to data from the zoom control logic, the focus control logic, data from other settings of the digital camera, and data from environmental characteristics surrounding the digital camera;
   wherein the other settings of the digital camera include focus, shutter speed, iris aperture, flash intensity, availability, and color; and
   wherein the environmental characteristics include ambient light, motion of a subject of the lens system, and color content of an imaged scene of the lens system.

15. The digital camera of claim 14 further comprising:
   the lens system further including a focus capability; and
   the control logic further including
   the ISO control logic being further responsive to data from the focus control logic to adjust the sensitivity of the CCD.

16. The digital camera of claim 15 further comprising:
   a flash device; and
   the control logic further including;
      flash control logic for controlling the flash device; and
      the ISO control logic further responsive to data from the focus control logic to adjust the sensitivity of the CCD.

17. A method of setting an ISO sensitivity of a CCD coupled to a lens system, the method comprising:
   receiving at least one of a zoom in control and a zoom out control;
   zooming the lens system to a zoom setting in response to the one of the zoom in control and zoom out control;
   focusing the lens system to focus setting; and
   setting the ISO sensitivity of CCD, without manual intervention by a user of the CCD, in response to the zoom setting, the focus setting, data from other settings of an apparatus of the CCD, and data from environmental characteristics surrounding the apparatus;
   wherein the other settings of the apparatus include focus, shutter speed, iris aperture flash intensity, availability, and color; and
   wherein the environmental characteristics include ambient light, motion of a subject of the lens system ,and color content of an imaged scene of the lens system.

18. The method of claim 17 further comprising:
   measuring light in a scene being imaged; and
   the setting the ISO sensitivity being further in response to the measured light.

19. The method of claim 18 further comprising:
   adjusting operation of a flash in response to at least one of the zoom setting, the focus setting, and the measured light; and
   the setting the ISO sensitivity being further in response to the adjusting operation of the flash.

20. The method of claim 17 wherein setting the ISO sensitivity comprises setting the ISO sensitivity of less than the entire CCD.

21. The method of claim 20 wherein setting the ISO sensitivity of less than the entire CCD comprises separately setting the ISO sensitivity of pixels of a particular color.

22. The method of claim 20 wherein setting the ISO sensitivity of less than the entire CCD comprises separately setting the ISO sensitivity of pixels of a particular geographic region of the CCD.

23. A digital camera for use with a lens system that has zoom and focus capabilities, the digital camera comprising:
a body;
a zoom in control coupled to the body;
a zoom out control coupled to the body;
a shutter control coupled to the body;
a range finder coupled to the body;
a charge-coupled device (CCD) coupled to the body; and
control logic including:
zoom control logic responsive to the zoom in control and the zoom out control to operate the zoom capability of the lens system;
focus control logic responsive to the range finder to operate the focus capability of the lens system; and
ISO control logic to set an ISO sensitivity of the CCD, without manual intervention by a user of the digital camera, responsive to the zoom control logic, the focus control logic, data from other settings of the digital camera, and data from environmental characteristics surrounding the digital camera;
wherein the other settings of the digital camera include shutter speed, iris aperture, flash intensity, availability, and color; and
wherein the environmental characteristics include ambient light, motion of a subject of the lens system, and color content of an imaged scene of the lens system.

24. The digital camera of claim 23 wherein the ISO control logic is further responsive to the focus control logic to the ISO sensitivity of the CCD.

25. The digital camera of claim 24 further comprising:
A light meter;
the control logic further including flash control logic responsive to the light meter to operate a flash; and
the ISO control logic is further responsive to the flash control logic to set the ISO sensitivity of the CCD.

26. The digital camera of claim 25 wherein the light meter comprises the CCD.

27. The digital camera of claim 25 further comprising the flash.

28. The digital camera of claim 23 further comprising the lens system.

29. The digital camera of claim 23 further comprising storage to store images captured by the CCD.

30. A method of operating a digital imaging system, the method comprising:
receiving a zoom control input;
zooming a lens in response to the zoom control input;
finding a range in a scene viewed by the lens;
focusing the lens to that range;
measuring light in the scene;
performing an ISO calculation based upon the zooming of the lens, the range, the focus of the lens, the light, data from other settings of the digital imaging system, and data from environmental characteristics surrounding the digital imaging system;
setting an ISO sensitivity of a charge-coupled device (CCD), without manual intervention by a user of the digital imaging system, in response to the iSO calculation; and
activating the CCD to capture an image according to the set ISO sensitivity;
wherein the other settings of the digital imaging system include focus, shutter speed, iris aperture, flash intensity, availability, and color; and
wherein the environmental characteristics include ambient light, motion of the scene, and color content of the scene.

31. The method of claim 30 further comprising controlling operation of a flash in response to at least one of the range, the measured light, the ISO calculation, and the set ISO sensitivity.

32. The method of claim 31 wherein controlling operation of the flash comprises:
determining that the range is too great for effective operation of the flash;
not operating the flash; and
adjusting the CCD to a higher ISO setting to increase efficiency of the CCD in a low light condition.

33. The method of claim 31 wherein controlling operation of the flash comprises:
determining that the range is too close for effective operation of the flash;
not operating the flash; and
adjusting the CCI) to a lower ISO setting.

34. The method of claim 30 wherein setting the ISO sensitivity comprises setting ISO sensitivity of less than all colors' pixels of the CCD.

35. The method of claim 30 wherein setting the ISO sensitivity comprises setting ISO sensitivity of a region of the CCD, the region covering less than the entire CCD.

36. A method of operating a digital camera, the method comprising:
dynamically adjusting an ISO sensitivity of a charge-coupled device (CCD) of the digital camera, without manual intervention by a user of the digital camera, in response to a camera setting and an environmental characteristic; and
capturing an image with the CCD using the dynamically adjusted ISO sensitivity;
wherein the camera setting includes focus, focal length, zoom distance, shutter speed, iris aperture, flash intensity, availability, and color; and wherein the environmental characteristic includes ambient light, motion of the image, and color content of the image.

37. The method of claim 36 wherein:
the camera setting comprises focal distance; and
the environmental characteristic comprises ambient light.

38. The method of claim 36 wherein:
the camera setting comprises an uncharged flash; and
the environmental characteristic comprises ambient light.

39. The method of claim 36 wherein the digital camera comprises a still camera.

40. The method of claim 36 wherein the digital camera comprises a video camera.

* * * * *